US009021914B1

(12) United States Patent
Newcomb

(10) Patent No.: US 9,021,914 B1
(45) Date of Patent: May 5, 2015

(54) CONTROLS FOR ZERO TURN MOWER

(76) Inventor: Harold Gene Newcomb, Pryor, OK (US)

( * ) Notice: Subject to any disclaimer, the term of this patent is extended or adjusted under 35 U.S.C. 154(b) by 392 days.

(21) Appl. No.: 13/524,001

(22) Filed: Jun. 15, 2012

Related U.S. Application Data

(60) Provisional application No. 61/507,468, filed on Jul. 13, 2011.

(51) Int. Cl.
G05G 11/00 (2006.01)
G05G 13/00 (2006.01)

(52) U.S. Cl.
CPC .............. G05G 11/00 (2013.01); G05G 13/00 (2013.01)

(58) Field of Classification Search
CPC ................. F16H 59/06; F16H 61/437; F16H 2059/0234; B60K 2741/003; G05G 11/00; G05G 1/04; G05G 1/30; G05G 1/46; G05G 5/08
USPC ....... 74/479.01, 480 R, 481, 512, 482, 473.1, 74/473.16, 473.17, 469, 471 R, 478, 478.5, 74/519, 522.5; 180/6.32, 6.62, 315, 332, 180/336; 56/11.4, 11.8
See application file for complete search history.

(56) References Cited

U.S. PATENT DOCUMENTS

| 2,604,962 | A | * | 7/1952 | Tibbetts | 477/206 |
| 3,537,328 | A | * | 11/1970 | James | 74/481 |
| 3,691,863 | A | * | 9/1972 | Shaffer | 74/478 |
| 3,722,314 | A | * | 3/1973 | Sorenson et al. | 74/512 |
| 3,898,891 | A | * | 8/1975 | Colloton | 74/473.11 |
| 3,995,510 | A | * | 12/1976 | Yost | 74/478.5 |
| 4,109,546 | A | * | 8/1978 | Povejsil | 74/473.16 |
| 4,174,761 | A | * | 11/1979 | Matsuyoshi et al. | 180/6.7 |
| 4,197,761 | A | * | 4/1980 | Volpi | 74/481 |
| 4,299,137 | A | * | 11/1981 | Malecha | 74/512 |
| 4,352,302 | A | * | 10/1982 | McAuliffe et al. | 74/473.11 |
| 5,022,477 | A | * | 6/1991 | Wanie | 180/6.34 |
| 5,048,638 | A | * | 9/1991 | Duncan et al. | 180/307 |
| 5,136,899 | A | * | 8/1992 | Hoch et al. | 477/96 |
| 5,351,571 | A | * | 10/1994 | Johnson | 74/478 |
| 5,842,378 | A | * | 12/1998 | Zellmer | 74/473.17 |
| 6,237,711 | B1 | * | 5/2001 | Hunt | 180/336 |
| 6,279,937 | B1 | * | 8/2001 | Hunt | 180/336 |
| 7,302,789 | B2 | * | 12/2007 | Eavenson et al. | 56/11.8 |
| 7,849,941 | B2 | * | 12/2010 | Bares et al. | 180/6.32 |
| 8,522,901 | B1 | * | 9/2013 | VanLue | 180/6.32 |

* cited by examiner

Primary Examiner — William Kelleher
Assistant Examiner — Jake Cook
(74) Attorney, Agent, or Firm — Plager Schack LLP

(57) ABSTRACT

Controls for a zero turn mower comprise a foot control pedal assembly mechanically coupled to a transmission control lever. The transmission control lever is mechanically coupled to a control rod. The control rod is mechanically coupled to a control lever assembly. The control lever assembly is mechanically coupled to an enhanced lever.

3 Claims, 4 Drawing Sheets

CONTROLS FOR ZERO TURN MOWER

CROSS REFERENCE TO RELATED APPLICATIONS

This application claims priority to U.S. Provisional Application 61/507,468 filed on Jul. 13, 2011, which is incorporated by reference.

FIELD OF THE INVENTION

This invention relates to equipment for controlling the direction of machinery.

BACKGROUND OF THE INVENTION

The operation of Zero Turn Mowers (ZTM) is well known. The typical design of a ZTM has each rear wheel connected to a hydrostatic transmission. A hydrostatic transmission is a device that creates wheel rotation using pressurized fluid. Rotational force from an engine affects a pump that pressurizes transmission fluid. When a user moves an operating lever, the user controls the flow of fluid through the transmission and the rotational speed or the forward/reverse direction of a drive wheel. Maximum lever movement causes maximum fluid flow, which translates into a rapidly turning drive wheel. If one drive wheel turns more rapidly than the other, the ZTM moves along a curved path. If both drive wheels turn at the same speed, the ZTM follows a straight path. If one drive wheel stops and the other drive wheel turns, or if the wheels turn in opposite directions, the mower pivots.

ZTMs utilize two operating levers as noted above. These levers require constant usage of both hands. This makes it difficult if not impossible release either hand to wipe sweat from the face, swat an insect, or even wave to a passerby without the mower changing directions or having to stop the mower. The mower cannot be operated with only one hand. The user's hands and arms get very tired with the constant pressure required to operate a ZTM for several hours of operation and sometimes can cause problems with the arms and shoulders. Some ZTMs have only foot controls for physically disabled users but those ZTMs do not have the control required for safety.

The present invention teaches a ZTM control system where the user has complete control by using only the user's hands or only the user's feet or both the user's hands and the user's feet. Using the disclosed design, the user's hands have the freedom to perform independent functions as well as resting. The invention is particularly useful for elderly people, women, or physically disabled individuals with weak arms or shoulders. Almost anyone can now use the ZTM with ease and safety.

BRIEF SUMMARY OF THE INVENTION

Controls for a zero turn mower comprise a foot control pedal assembly mechanically coupled to a transmission control lever. The transmission control lever is mechanically coupled to a control rod. The control rod is mechanically coupled to a control lever assembly. The control lever assembly is mechanically coupled to an enhanced lever.

BRIEF DESCRIPTION OF THE SEVERAL VIEWS OF THE DRAWINGS

Figure 1:
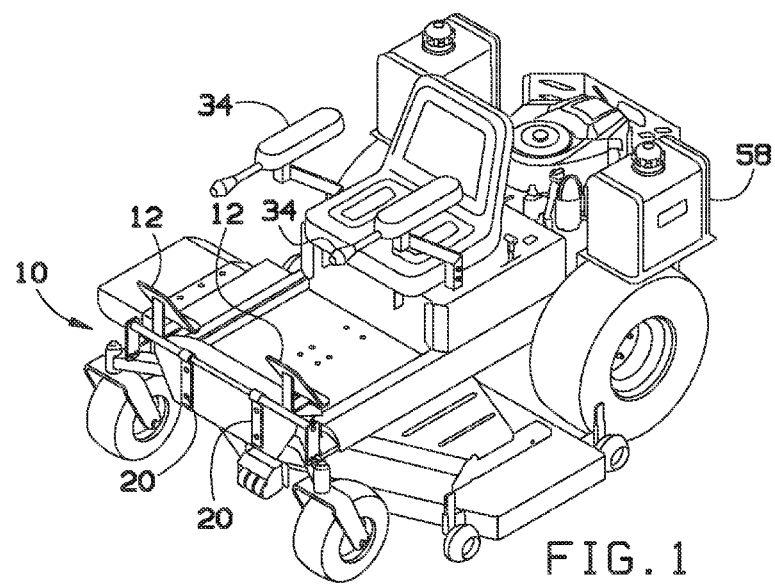
Figure 2:
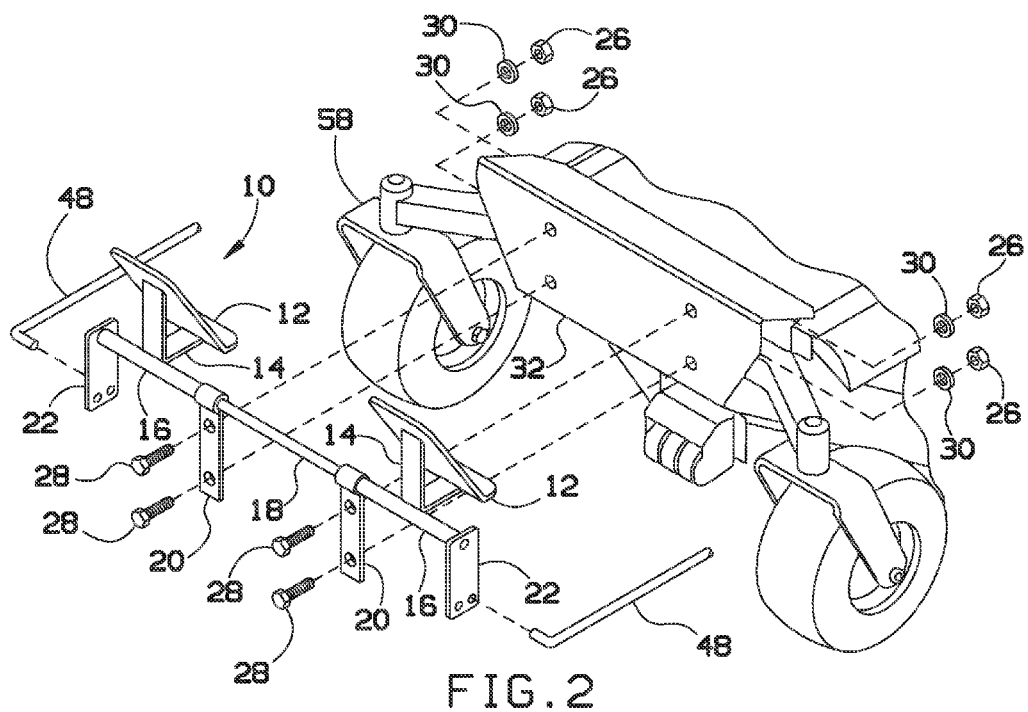
Figure 3:
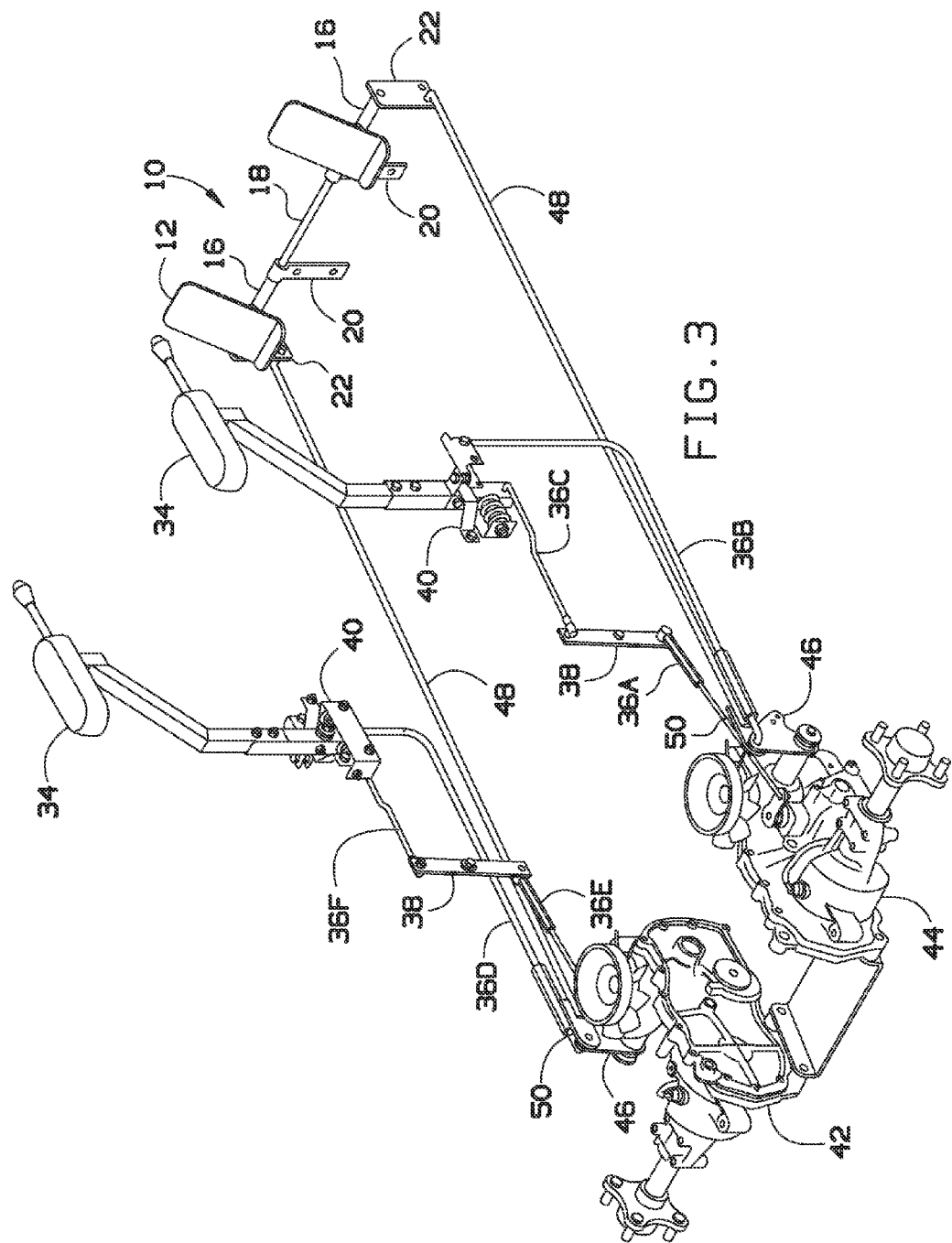
Figure 4:
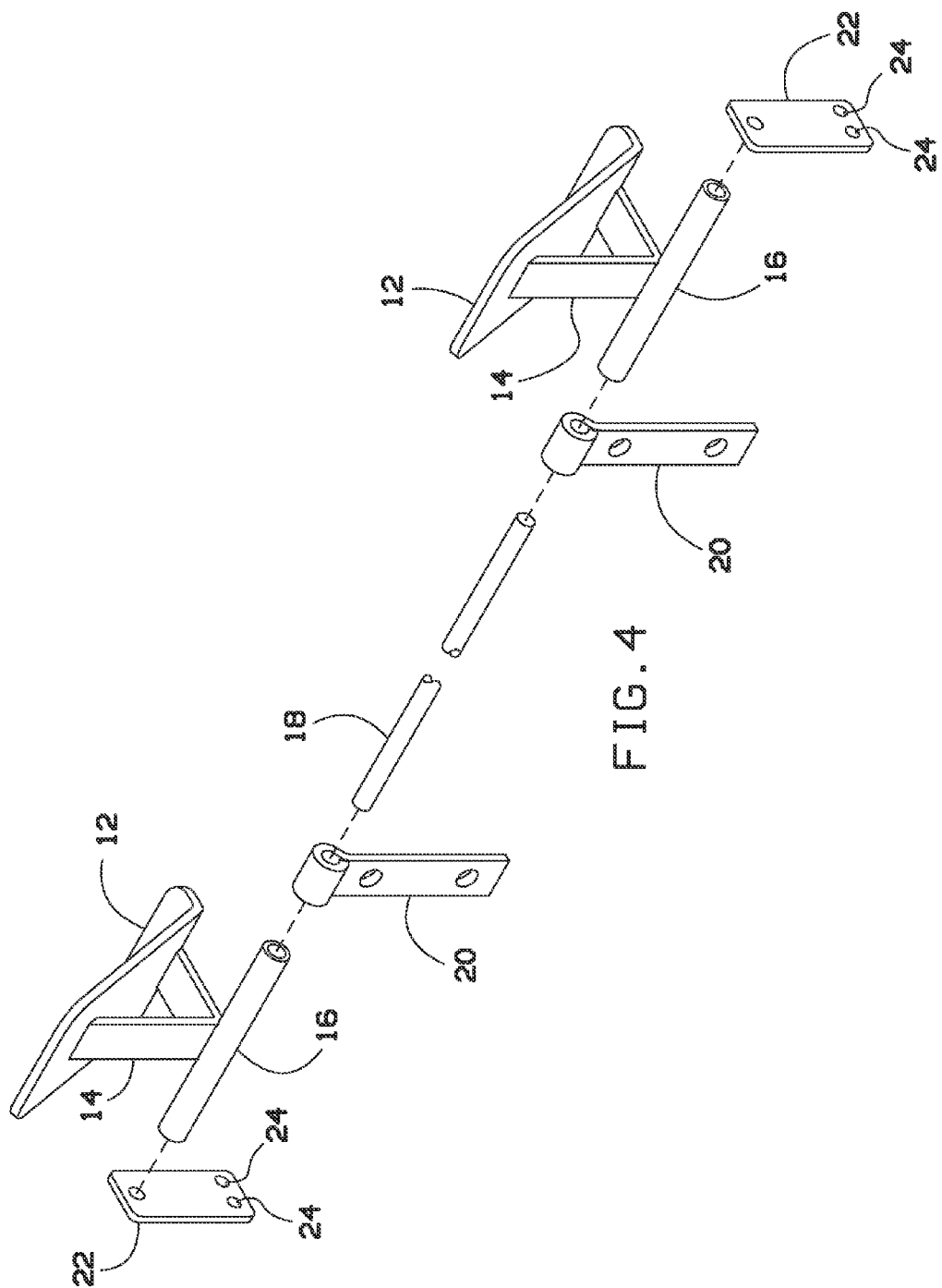
Figure 5:
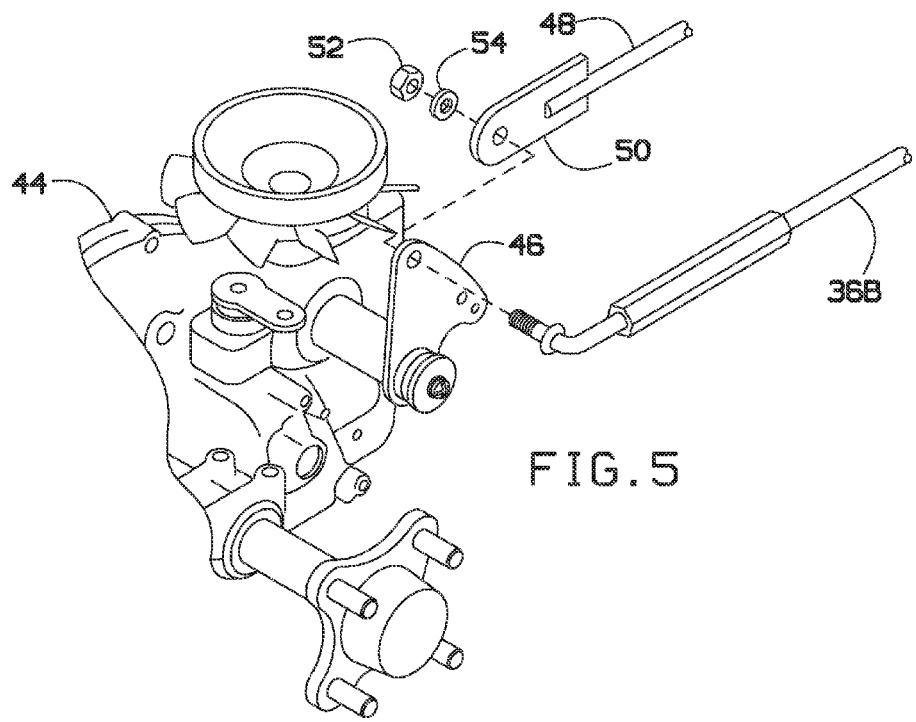
Figure 6:
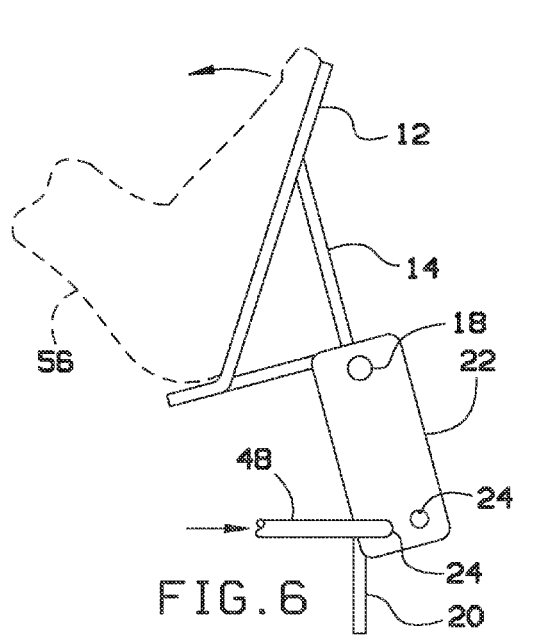
Figure 7:
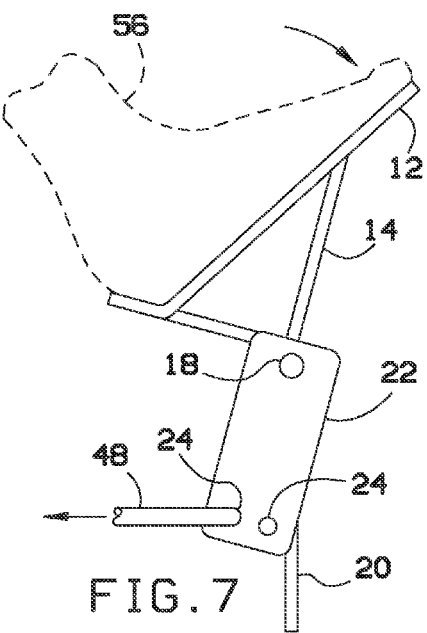

Having thus described the invention in general terms, reference will now be made to the accompanying drawings, which are not necessarily drawn to scale, and wherein:

FIG. 1 is a perspective view of the invention shown in use.
FIG. 2 is an exploded perspective of the invention.
FIG. 3 is a perspective view of the invention.
FIG. 4 is an exploded view of the foot control pedal assembly.
FIG. 5 is a detailed perspective of the invention showing the right side transmission hookup.
FIG. 6 is a detailed side view of the invention showing the pedal control rod forward movement.
FIG. 7 is a detailed side view of the invention showing the pedal control rod reverse movement.

DETAILED DESCRIPTION OF THE INVENTION

Embodiments of the present invention overcome many of the obstacles associated with controlling a zero turn mower (ZTM), and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. Zero turn mower 58 is mechanically coupled to enhanced levers 34 as shown in FIG. 3. Zero turn mower 58 is further mechanically coupled to foot control pedal assembly 10. Foot control pedal assembly 10 comprises foot pedals 12 which are mechanically coupled to hinge brackets 20 as shown in FIG. 2.

Enhanced lever 34 is a racing style lever with an arm rest. The arm rest enables the user to rest one's arms while controlling lever assembly 40. Using foot controls with feet applying the necessary pressure to move zero turn mower 58 in the direction and speed desired while resting the arms on the arm rests, now makes the prior art long bent hand levers unnecessary. Short racing style levers will accomplish the same purpose and eliminate tiring of the hands. Likewise, armrests aid in resting arms and shoulders even more.

FIG. 2 shows Foot control pedal assembly 10 in more detail. Zero turn mower 58 is mechanically coupled to foot rest 32. Pedal rod 18 is mechanically coupled to bracket 14, pipe sleeve 16 and end plate 22 as shown. Pedal rod 18 is mechanically coupled to foot rest 32 by inserting bolt 28 through hinge bracket 20 and into a hole in foot rest 32 where the mechanical couple is completed by washer 30 and nut 26. Pedal transmission control rod 48 is mechanically coupled to end plate 22.

FIG. 3 shows a perspective view of the invention. Right side transmission 44 is mechanically coupled to transmission control lever 46 which is further mechanically coupled to rod bracket 50. Rod bracket 50 is mechanically coupled pedal transmission control rod 48. Transmission control lever 46 is mechanically coupled to first control rod 36A and second control rod 36B as shown in more detail in FIG. 5. First control rod 36A is mechanically coupled to rod lever 38, which is further mechanically coupled to third control rod 36C. Third control rod 36C and second control rod 36B are mechanically coupled to control lever assembly 40. Control lever assembly 40 is mechanically coupled to enhanced lever 34.

In a similar manner, left side transmission 46 is mechanically coupled to transmission control lever 46 which is further mechanically coupled rod bracket 50. Rod bracket 50 is mechanically coupled pedal transmission control rod 48. Transmission control lever 46 is mechanically coupled to fourth control rod 36D and fifth control rod 36E as shown in more detail in FIG. 5. Fourth control rod 36D is mechanically coupled to rod lever 38, which is further mechanically coupled to sixth control rod 36F. Fourth control rod 36D and second sixth control rod 36F are mechanically coupled to control lever assembly 40. Control lever assembly 40 is mechanically coupled to enhanced lever 34.

As noted above, pedal transmission control rod 48 is mechanically coupled to end plate 22. Not that the construction of control lever assembly 40 enables enhanced lever 34 to move in unison with pedal 12. That is, a user could drive zero turn mower 58 with one's hands, one's feet or both, depending on user preference.

FIG. 4 shows an explosion view of foot control panel assembly 10. FIG. 4 shows a mirror image of the same assembly in FIG. 3, therefore right end plate 22 is shown on the left hand side. Right end plate 22 comprises a first control rod hole 24 and a second control rod hole 24. Right in plate 22 is mechanically coupled to right pipe sleeve 16. Right pipe sleeve 16 is mechanically coupled to right foot pedal bracket 14. Right foot pedal bracket 14 is mechanically coupled to right foot pedal 12. Right pipe sleeve 16 is mechanically coupled to right hinge bracket 20. Pedal rod 18 can be inserted through right end plate 22 then through right pipe sleeve 16 then through right hinge bracket 20 then through left hinge bracket 20 then through right pipe sleeve 16 and finally into right end plate 22 as shown in more detail in FIG. 6 in FIG. 7.

Similarly, left end plate 22 comprises a third control rod hole 24 and a fourth control rod hole 24. Left end plate 22 is mechanically coupled to left pipe sleeve 16. Left pipe sleeve 16 is mechanically coupled to left foot pedal bracket 14. Left foot pedal bracket 14 is mechanically coupled to left foot pedal 12. Left pipe sleeve 16 is mechanically coupled to left hinge bracket 20. Pedal rod 18 can be inserted through right end plate 22 then through left pipe sleeve 16 then through left hinge bracket 20 then through left hinge bracket 20 then through left pipe sleeve 16 and finally into left end plate 22 as shown in more detail in FIG. 6 in FIG. 7.

Right side transmission 44 is identical form and function to a right side transmission 44 in a traditional zero turn mower as described above. The novel difference in the present invention is that the present invention allows right side transmission 44 to be adjusted by pedal transmission control rod 48.

FIG. 5 shows the operation of this novel feature. Right side transmission 44 is mechanically coupled to transmission control lever 46. Transmission control lever 46 is mechanically coupled to control rod 36 and rod bracket 50 with washer 54 and nut 52. Rod bracket 50 is further mechanically coupled to pedal transmission rod 48.

FIG. 6 and FIG. 7 show the effect of the movement of user 56 on pedal control rod 48. As user 56 pulls pedal 12 toward user 56, that is, counter clockwise about first hole 24, transmission control lever 46 is pulled forward or clockwise and right side transmission 44 will slow down. Conversely, as user 56 pushes pedal 12 away from user 56, that is, clockwise about first hole 24, transmission control lever 46 is pulled backward or counter-clockwise and right side transmission 44 will speed up. User 56 can speed up or slow down left side transmission 42 or right side transmission 44.

All of the components listed above can be made from a wide range of materials using known techniques, however, assembling the disclosed invention with steel components using traditional metalworking technology has proven effective.

That which is claimed:

1. Controls for a zero turn mower, comprising,
    a foot control pedal assembly mechanically coupled to a left transmission control lever and a right transmission control lever;
    a left control rod, mechanically coupled to the left transmission control lever;
    a right control rod, mechanically coupled to the right transmission control lever;
    a left transmission mechanically coupled to the left transmission control lever and a left wheel on the zero turn mower;
    a right transmission mechanically coupled to the right transmission control lever and a right wheel on the zero turn mower;
    a left control lever assembly mechanically coupled to the left control lever and a left enhanced lever;
    a right control lever assembly mechanically coupled to the right control lever and a right enhanced lever;
    wherein manipulating the left pedal, the left control lever or both adjusts the left transmission and turning of the left wheel;
    wherein manipulating the right pedal, the right control lever or both adjusts the right transmission and turning of the right wheel.

2. The controls for a zero turn mower of claim 1, further comprising,
    where the foot control pedal assembly further comprises, a right pedal control rod mechanically coupled to the transmission control lever; a right end plate is mechanically coupled to a pedal rod;
    where the pedal rod mechanically couples a right pipe sleeve and a left pipe sleeve to a left end plate;
    where the right pipe sleeve is mechanically coupled to a right foot pedal; and
    where the left pipe sleeve is mechanically coupled to a left foot pedal.

3. The controls for a zero turn mower of claim 1, further comprising,
    where the foot control pedal assembly further comprises, a right pedal control rod mechanically coupled to the transmission control lever; a right end plate is mechanically coupled to a pedal rod;
    where the pedal rod mechanically couples a right pipe sleeve; and a left pipe sleeve to a left end plate;
    where the right pipe sleeve is mechanically coupled to a right foot pedal;
    where the left pipe sleeve is mechanically coupled to a left foot pedal;
    where the pedal rod is mechanically coupled to a right hinge bracket and a left hinge bracket;
    where the left hinge bracket and the right hinge bracket are mechanically coupled to the zero turn mower.

\* \* \* \* \*